United States Patent
Bergman et al.

(10) Patent No.: US 8,342,217 B2
(45) Date of Patent: Jan. 1, 2013

(54) LUBRICANT FOR RUN FLAT TIRE SYSTEM

(75) Inventors: Brian R. Bergman, Clermont-Ferrand (FR); Elizabeth L. Hotaling, Piedmont, SC (US)

(73) Assignee: Michelin Recherche et Technique S.A. (CH)

( * ) Notice: Subject to any disclaimer, the term of this patent is extended or adjusted under 35 U.S.C. 154(b) by 215 days.

(21) Appl. No.: 12/445,954

(22) PCT Filed: Dec. 4, 2006

(86) PCT No.: PCT/US2006/046233
§ 371 (c)(1), (2), (4) Date: Apr. 17, 2009

(87) PCT Pub. No.: WO2008/069784
PCT Pub. Date: Jun. 12, 2008

(65) Prior Publication Data
US 2010/0314016 A1    Dec. 16, 2010

(51) Int. Cl.
*B60C 19/12* (2006.01)
*C10M 169/02* (2006.01)

(52) U.S. Cl. ........................ 152/503; 508/136

(58) Field of Classification Search ............ 152/503; 508/136
See application file for complete search history.

(56) References Cited

U.S. PATENT DOCUMENTS

| | | | | |
|---|---|---|---|---|
| 3,946,783 | A | * | 3/1976 | Edwards et al. ............ 152/503 |
| 4,051,884 | A | * | 10/1977 | Bourne et al. ............. 152/509 |
| 5,126,141 | A | | 6/1992 | Henry |
| 6,503,740 | B1 | | 1/2003 | Alther |
| 7,040,367 | B2 | | 5/2006 | Kollin |
| 7,041,626 | B2 | | 5/2006 | Salaun et al. |
| 2006/0016535 | A1 | * | 1/2006 | Mauclin et al. ............ 152/158 |

FOREIGN PATENT DOCUMENTS

JP  2003301188 A  * 10/2003
JP  2005343955 A  * 12/2005

OTHER PUBLICATIONS

International Search Report, PCT/US2006/046233, dated Oct. 15, 2007.

* cited by examiner

*Primary Examiner* — Katarzyna Wyrozebski Lee
*Assistant Examiner* — Daniel Lee
(74) *Attorney, Agent, or Firm* — Frank J. Campigotto

(57) ABSTRACT

Lubricant compositions as well as methods and articles utilizing the lubricant compositions that comprise a polyoxyalkene as a lubricating agent, between 4 wt. % and 7.5 wt. % of silica as a thickening agent and an inorganic thixotropic-enhancing metal compound added in an amount of, for example, at least 20 ppm, by weight or alternatively, between 1 ppm and 2 wt. %. The silica may be fumed silica. Examples of the metal compound include KOH, NaOH, KCl, $CaCl_2$, $MgCl_2$, CaO, MgO, $Mg(OH)_2$ or combinations thereof. A tire is also included, comprising a radially inner face designed to be opposite a wheel rim on which it is designed to be mounted, wherein the radially inner face is provided with the lubricant composition described above.

6 Claims, 4 Drawing Sheets

LUBRICANT FOR RUN FLAT TIRE SYSTEM

BACKGROUND OF THE INVENTION

1. Field of the Invention

This invention relates generally to lubricants and more particularly, to lubricant compositions and methods for their use in a run-flat tire system.

2. Description of the Related Art

Run-flat tire systems have been developed to provide tires for vehicles that can be operated in a deflated condition for a suitable distance at a desired speed. Such systems have provided significant benefits to vehicle operators including safety benefits that are realized when, for example, a vehicle can continue traveling with a deflated tire under conditions that are not safe for changing the tire at the side of a road. Thus, run-flat tire systems improve the safety of the vehicle by allowing the vehicle to continue to travel for a certain time until a suitable place for repairs can be found.

Run-flat systems having safety support rings are well known. U.S. Pat. No. 6,944,948 of Pompier, which has been assigned to Michelin Recherche et Technique, discloses such a system. Pompier discloses a run-flat tire system having a safety support ring consisting of a circular body adapted for fitting onto a wheel rim of a vehicle. The disclosed safety support ring is comprised of a vulcanized rubber mix and includes areas that are reinforced by, for example, metallic or textile wires or cables. While Pompier discloses a safety support ring made of a vulcanized rubber mix, the support rings are not so limited and may be made, for example, of plastics such as polyurethane.

Such safety support rings are generally mounted on a wheel rim inside a tire to provide support for the crown of the tire when it is rolling at low or zero pressure. The safety support ring is meant to prevent direct contact between the tire and the wheel rim because such contact generally results in rapid deterioration of the tire.

To improve rolling under the condition of low or zero pressure, it is preferable to provide lubrication at the interface between the inside surface of the tire and the surface of the support ring. Such lubrication promotes extended durability in the friction zones that are subjected to relatively high temperatures due to the friction between the surfaces if no lubrication is provided.

One example of a lubricant composition that has been used for lubricating the interface between the inside surface of a tire and the surface of a safety support ring is disclosed in U.S. Pat. No. 6,750,181 of Salaun, et al, which has been assigned to Michelin Recherche et Technique. The lubricant composition disclosed by Salaun includes an aqueous or nonaqueous lubricating agent and a polysaccharide intended to thicken the lubricating agent and impart a thixotropic property to the lubricant.

As known to those having ordinary skill in the art, a thixotropic material is a pseudoplastic non-Newtonian fluid that, after undergoing shear thinning, has the potential to have its structure reformed when allowed to rest over a period of time. A pseudoplastic fluid has a viscosity that decreases as the applied shear rate increases and that decreases at a constant applied shear rate. The process of applying a shear rate to decrease viscosity is called shear thinning. Therefore, a thixotropic material that is a gel, for example, may become a free-flowing liquid when subjected to shear thinning but upon the cessation of the applied shear rate, the structure of the material may reform and convert back to a gel over time as the material rests.

Another example of a lubricant composition that has been used in a run-flat tire system is disclosed in U.S. Patent Publication No. 2002/0016535 of Mauclin, et al., which has been assigned to Michelin Recherche et Technique. Mauclin discloses a lubricating composition that includes a lubricating agent and a thickening agent, the preferred lubricating agents being a polyoxyalkene with between 4 wt. % and less than 7.5 wt. % fumed silica as the thickening agent.

Generally, the lubricant compositions of the run-flat tire system may be applied to the surface of the safety support ring (if a safety support ring is part of the run-flat tire system), the inside surface of the tire or both. The thickening agent added to the lubricant composition is intended to increase the viscosity of the lubricating agent so as to minimize the flowing of the lubricating agent due to its weight when the vehicle is at rest or is traveling with its tires inflated.

SUMMARY OF THE INVENTION

The present invention provides lubricant compositions as well as methods for their making and their use and articles that use the lubricant compositions. In a particular embodiment of a lubricant composition of the present invention, the lubricant composition comprises a polyoxyalkene as a lubricating agent, between 4 wt. % and 7.5 wt. % of silica as a thickening agent and an inorganic thixotropic-enhancing metal compound. The metal compound may, for example, be added in particular embodiments in an amount of at least 20 ppm, by weight or alternatively, between 1 ppm and 2 wt. %. The silica may be a fumed silica.

In particular embodiments of the present invention, the metal component of the thixotropic-enhancing metal compound may be selected from alkali metals, alkaline earth metals or combinations thereof. Likewise, the anion associated with the thixotropic-enhancing metal compound may be selected from chlorides, hydroxides, sulfides, oxides or combinations thereof. Examples of the metal compound include KOH, NaOH, KCl, $CaCl_2$, $MgCl_2$, CaO, MgO, $Mg(OH)_2$ or combinations thereof.

Particular embodiments of the present invention include the polyoxyalkene as a polyoxyalkene glycol and embodiments include the polyoxyalkene having an alkene portion selected from ethylene, propylene, butylene or combinations thereof.

Particular embodiments of the present invention further include a tire comprising a radially inner face designed to be opposite a wheel rim on which it is designed to be mounted, wherein the radially inner face is provided with the lubricant composition described above.

Additional embodiments include a lubricant composition comprising a lubricating agent selected from glycerol, polyalkylene glycol or combinations thereof, an organoclay and a viscosity-enhancing inorganic metal compound. The viscosity-enhancing inorganic metal compounds include the same compounds as described above as thixotropic-enhancing compounds. However, these compounds surprisingly increase the TS1 properties of the lubricant composition and hence, they are identified as viscosity-enhancing compounds in those embodiments of the present invention that include organoclay as the thickening agent.

The foregoing and other objects, features and advantages of the invention will be apparent from the following more particular descriptions of particular embodiments of the invention.

DETAILED DESCRIPTION OF PREFERRED EMBODIMENTS

Figure 1A:
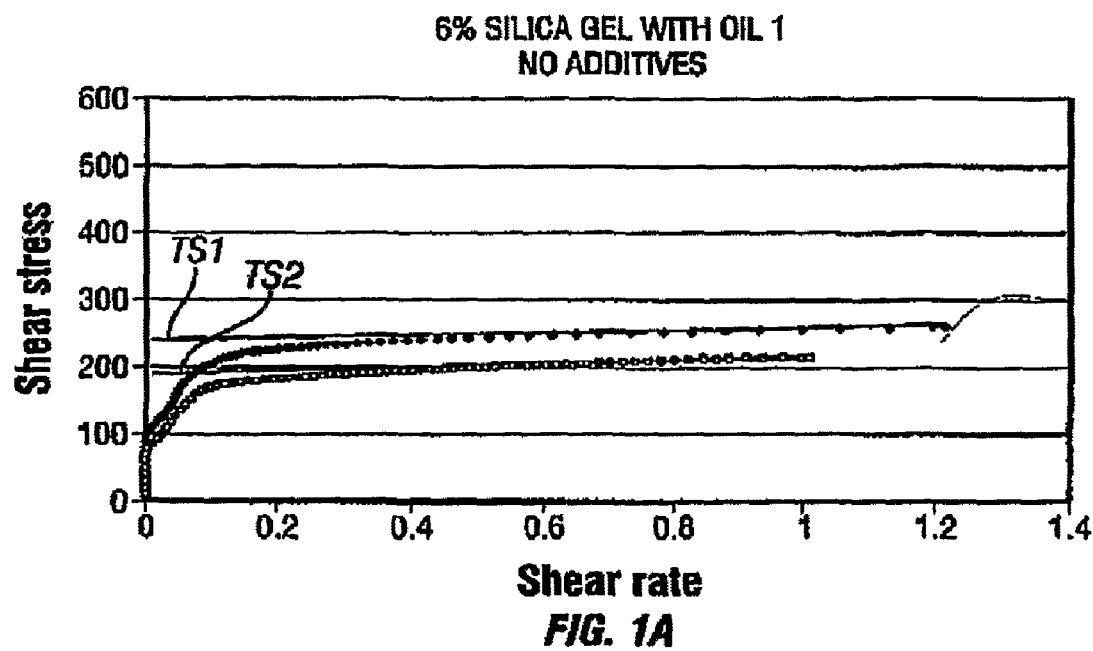
FIGS. 1A-E are graphs of the shear rate plotted against the shear stress obtained from a cone-plate rheometer to determine the initial threshold stress value TS1 and the recovered threshold stress value TS2 of lubricant compositions having fumed silica as a thickening agent and differing thixotropic-enhancing metal compounds.

The present invention includes a lubricant composition useful for lubricating the interface between the inside of a tire and the surface of a safety support ring for a run-flat tire system. The invention further includes run-flat tire systems having safety support rings as well as those that are designed to operate without safety support rings, both using such lubricant compositions. The invention further includes methods for using and making such lubricant composition.

In particular embodiments of the present invention, a lubricant composition is provided that includes a lubricating agent, a thixotropic thickening agent that thickens and imparts a thixotropic character to the lubricant composition and an inorganic thixotropic-enhancing metal compound. The addition of even a small amount of the inorganic metal compound advantageously not only increases the viscosity of the lubricant composition but quite surprisingly, typically increases the thixotropic properties of the composition.

Non-limiting examples of metals included in the inorganic thixotropic-enhancing metal compound include, for example, the alkali metals, the alkaline earth metals, iron, cobalt, nickel, aluminum, copper, zinc and combinations thereof. The more suitable metals are those that have a +1 or +2 valence state.

Non-limiting examples of the anion associated with the inorganic thixotropic-enhancing metal compound include, for example, chlorides, hydroxides, sulfides and oxides. The more suitable anions are those having a −1 or −2 valence state.

Particular embodiments include, for example, inorganic thixotropic-enhancing metal compounds such as KOH, NaOH, KCl, NaCl, $MgCl_2$, CaO, MgO and combinations thereof.

To increase the viscosity of the lubricant composition and increase its thixotropic properties, the inorganic thixotropic-enhancing metal compound is added in an amount of at least about 1 ppm or alternatively, at least about 50 ppm or at least 20 ppm. Particular embodiments of the present invention include an amount of inorganic thixotropic-enhancing metal compound of between about 1 ppm and about 2 wt. %, of between 10 ppm and 1 wt. %, of between 10 ppm and 800 ppm, of between 50 and 700 ppm or alternatively, between about 100 ppm and about 700 ppm.

Non-limiting examples of suitable lubricating agents include diols, triols, tetrols, polyhydric alcohols, glycol ethers, glycerin or mixtures thereof. Particular embodiments have lubricating agents that include one or more polyoxyalkylenes, especially polyalkylene glycols. Examples of preferred polyalkylene glycols include polyethylene glycol, polypropylene glycol, polybutylene glycol or mixtures thereof.

Particular embodiments of the lubricant composition include a copolymer that is a mixture of alkylene oxides, and more particularly, mixtures of ethylene oxide and propylene oxide polymers. Particular embodiments comprise units resulting from ethylene oxide in a preferred mole fraction of between about 40% and about 80% (alternatively between about 50% and about 70%), and units resulting from propylene oxide in a mole fraction of between about 20% and about 60% (alternatively, between about 30% and about 50%). When selecting a polyalkylene glycol lubricating agent, consideration should be given to hygiene issues such as those disclosed in the literature, e.g., ECETOC, European Centre for Ecotoxicology and Toxicology of Chemicals, Technical Report No. 55, *Pulmonary Toxicity of Polyalkylene Glycols*, Brussels, December 1997, ISSN-0773-8072-55.

Particular embodiments of the lubricant composition include lubricating agents that may be characterized as having an apparent viscosity of between about 100 and about 2,000 centipoise (1 centipoise=1 mPa·s) and more particularly between about 500 and about 1,600 centipoise when measured at 23° C. in accordance with European and International standard EN ISO 2555 (June 1999) (viscosity by the Brookfield method; rotating viscometer of type A; rotation speed 20 RPM; mobile No. 2; model RVT).

Particular embodiments of the present invention further include a polyoxyalkene having a number-average molecular weight (Mn) between 1,000 and 10,000 g/mol or alternatively between 2,000 and 6,000 g/mol. Furthermore, the polymolecularity index (Ip) of particular embodiments is less than about 1.5 or alternatively, less than 1.3, wherein Ip=Mw/Mn where Mw is the weight-average molecular weight.

Examples of suitable ethylene oxide and propylene oxide copolymer lubricating agents that are available commercially include SYNALOX 40D300 and UCON 75H1400, which are available from Dow Chemical Company; BREOX 60W460 and BREOX 60W320, which are available from Cognis Corporation having offices in Cincinnati, Ohio; and CLARIANT D21/300, which is available from Clariant Corporation having offices in Charlotte, N.C. Other suitable copolymers include, for example, EMKAROX VG 217W, EMKAROX VG 379W, EMKAROX VG 650W and EMKAROX VG 1051W, all available from Uniqema, with offices in Delaware.

In particular embodiments of the lubricant composition, glycerin is used as the lubricating agent. A suitable glycerin for use in the present invention is commercially available under the trade name SUPEROL from Procter & Gamble, Cincinnati, Ohio. SUPEROL is 99.7% pure glycerol and produces a superior lubricant composition as compared to STAR glycerin, also a Procter & Gamble product, which is only 96% pure glycerol.

The lubricant composition should be compatible with all the components of the run-flat tire system in which the lubricant composition is being used. Such components of the run-flat system may include, for example, the tire, the safety support ring, the wheel, the electronic pressure monitor and any chemicals or lubricants applied separately to these or other components.

For example, the lubricant composition should be compatible with any of the materials that may be used for the inside of the tire and/or for the safety support ring. Preferred materials for the safety support ring include, for example, natural and synthetic rubbers as well as polymers such as polyurethane or thermoplastic elastomer (TPE). These materials, as well as the other components of the run-flat tire system, should be subjected to an aging test with the lubricant composition to determine their compatibility by using methods known to those having ordinary skill in the art. A lubricant-free control sample of each material should also be subjected to an identical aging test for comparison. Material measurements—notably weight, dimensions, Shore hardness, and tensile strength—should be made before and after the aging test. Changes to the critical characteristics of the materials caused by lubricant incompatibility may alter the performance and/or acceptability of the system. Such changes may include, for example, swelling, shrinking, hardening, softening, becoming more or less brittle and/or changing color.

Particular embodiments of the present invention include the lubricant composition having a thixotropic agent that both thickens the composition and imparts or improves the thixotropic property of the composition.

The desired thixotropic properties of the present invention may be characterized by the initial threshold stress value (TS1) of the lubricant composition and by the recovered threshold stress value (TS2) of the lubricant composition, which is determined after the lubricant composition has undergone a set amount of shear stress and then allowed to recover. The procedure for measuring the TS1 and the TS2 threshold stress values of a lubricant composition is provided in Example 3 of the examples section that follows.

The desired thixotropic properties of the present invention provide a lubricant composition that does not flow under its own weight when at rest, that does not flow well when subjected to shear stress levels that are less than TS1, and that upon cessation of the shear stress, returns to a form having a TS2 that is at least 50% of TS1. In particular embodiments of the present invention, the material returns to a TS2 that is within at least 25% of TS1 and alternatively, within at least 10% of TS1. Particular embodiments of the present invention include a lubricant composition having a TS2 that is within at least 5% if TS1 or alternatively, between 3% of TS1 and TS1 itself. Thus, particular embodiments of the present invention include lubricant compositions that have a TS2 that is substantially the same as TS1, which means that TS1 and TS2 are measured as the same within the error of the measuring devices and method. In particular embodiments of the present invention, the lubricant composition has a initial threshold stress TS1 greater than about 50 Pa and in others, greater than about 150 Pa. Particular embodiments include a range for TS1 of between about 200 and about 600 Pa and others, between about 275 and about 475 Pa.

High threshold stress values of the lubricant composition are desired because they relate to maintaining the balance of the lubricant composition in the tire. Vehicle operators demand that the tires on their cars perform at a minimum level of noise and vibration. If the lubricant composition moves around inside the tire during normal operation, the balance of the tire may become affected and cause the tire to become unbalanced, thereby causing excessive noise and vibration.

Viscosity of the lubricant composition may be controlled by adjusting the amount of lubricating agent in the lubricant composition. Though not limiting the invention, particular embodiments of the lubricant composition of the present invention have a viscosity of between about 10 and about 60 Pa·s and preferably between about 20 and about 50 Pa·s at 20° C. under a shear rate of $10\,s^{-1}$ as measured on a cone and plate rheometer.

Those having ordinary skill in the art may adjust the amount of lubricating agent according to the particular nature and geometry of the safety support ring or other components of the particular run-flat system in order to avoid the risks due to excessively high or excessively low fluidity of the lubricant composition. The risks associated with excessively high fluidity include the parasitic drainage of the lubricant composition while at rest, which may cause wheel-balance problems during subsequent normal operating conditions, i.e., at normal inflation pressure. The risks associated with excessively low fluidity include the non-uniform distribution of the lubricant composition around the safety support ring during flat running operating conditions, which would typically cause an adverse effect on the overall endurance of the tire and safety support ring.

Particular embodiments of the present invention provide a lubricant composition that possesses the desired thixotropic and lubricant properties when operating over a wide range of outside weather temperatures such as, for example, between about −40° C. and about 55° C.

The thickening agent may be selected from a polysaccharide, an organoclay or silica. Each of these thickening agents imparts at least some thixotropic properties to the lubricant composition of the present invention, with the organoclay imparting the greatest amount. It should be noted that when an organoclay is used as the thickening agent, the thixotropic properties are already so high that the addition of the metal compound typically does not increase the thixotropic properties although the addition surprisingly does increase the TS1 and TS2. The polysaccharide in particular embodiments of the present invention is a xanthan gum. Particular embodiments of the present invention include the polysaccharide in an amount of between about 1 wt. % and about 2 wt. %.

Those embodiments having silica as the thickening agent may include any silica known to those having ordinary skill in the art. Particular embodiments include fumed silica, especially those having BET and CTAB surface areas below about 450 $m^2/g$. Particular embodiments include a BET surface area of between 50 and 350 $m^2/g$ or alternatively, between 100 and 250 $m^2/g$. Particular embodiments having a safety support made of a diene elastomer, such as natural rubber, or from a polyurethane elastomer may include, for example, fumed silica as the thickening agent having a BET of between 100 and 250 $m^2/g$.

In the present description of the silica, the BET specific surface area ("area per unit mass") is determined by gas adsorption using the Brunauer-Emmett-Teller method described in "The Journal of the American Chemical Society", Vol. 60, p. 309, February 1938, and more precisely in accordance with French standard NF ISO 9277 of December 1996 [multipoint volumetric method (5 points)—gas: nitrogen—degassing: 1 hour at 160° C.—relative pressure range $p/p_o$: 0.05 to 0.17]. The CTAB specific surface area is the external surface area determined in accordance with French standard NF T 45-007 of November 1987 (method B).

Particular embodiments of the lubricant composition according to the invention having silica include the silica in an amount that must be higher than 4.0% and lower than 7.5%, otherwise the endurance levels during flat running required for the mounted assemblies of the invention are not reached. For that reason, the proportion of silica in particular embodiments is between 5.3 wt. % and 6.7 wt. % or alternatively between 5.5 wt. % and 6.5 wt. %. A mass fraction of silica equal to about 6.0 wt. % (e.g., 6.+−.0.3%) has been used in numerous embodiments of the present invention.

Advantageously, the lubricant composition having silica as the thickening agent does not require the presence of water, which favors the interaction of the lubricating agent (polyoxyalkene) with the thickening agent (silica). It is for this reason that it can be called "non-aqueous" or of the non-aqueous type, even though it can tolerate the presence of a small amount of water without ill effect. Embodiments of the present invention are "non-aqueous" compositions having silica, which is understood to mean compositions containing less than 2 wt. % or alternatively leis than 1 wt. % of water (% by weight of the lubricant composition).

Particular embodiments of the invention having an organoclay as the thickening agent include a mineral clay mixture that has been treated with an alkyl quaternary ammonium compound and comprises sepiolite, palygorskite or mixtures thereof. Particular embodiments include a mineral clay mixture that has been treated with an alkyl quaternary ammonium compound includes at least one of sepiolite, palygorskite and a smectite with between about 50-100 wt. % sepiolite, palygorskite or a mixture of sepiolite and palygorskite, the balance smectite.

An example of an organoclay suitable for use as the thixotropic thickening agent is commercially available under the trade name GARAMITE from Southern Clay Products, Gonzales, Tex. The GARAMITE organoclay comprises a clay mixture that has been treated with a quaternary ammonium compound, preferably an alkyl quaternary ammonium salt, 50-95 wt. % sepiolite, palygorskite or a mixture of the two, with the balance of the clay mixture being smectite, as set forth in U.S. Pat. No. 6,036,765.

In particular embodiments of the present invention, the organoclay is added to the lubricant composition in an amount that is at least 5 wt. % of the total weight of the lubricant compound, between about 10 and 30 wt. % or between about 3 and 40 wt. %. Particular embodiments of the present invention include adding the organo clay in an amount that is less than about 40 wt. % or less than about 30 wt. % of the total weight of the lubricant composition.

In particular embodiments of the present invention, the lubricant composition may include one or more additives such as, for example, antioxidants, coloring compounds, bactericides, ionic, non-ionic surfactants or mixtures thereof. The total content of such additives in the lubricant composition is preferably, but not limited to, less than about 2 wt. %. Particular embodiments of the present invention further include drying the organoclay before incorporating it into the lubricant composition.

The invention is further illustrated by the following examples, which are to be regarded only as illustrations and not delimitative of the invention in any way.

EXAMPLE 1

This example provides a procedure for mixing the components of the lubricant composition having silica as the thickening agent. Approximately 6 g of the fumed silica (CAB-O-SIL M5, manufactured by Cabot Corp. of Tuscola, Ill.), approximately 93.9 g of a lubricating agent (EMKAROX VG 379W, a 50/50 copolymer of PEG/PPG, available from Uniqema) and approximately 0.1 g of a 50-50 wt. % solution of the thixotropic-enhancing metal compound in water were measured out separately and combined by hand mixing to make a lubricant composition having 6 wt. % fumed silica. If the thixotropic-enhancing metal compound was not soluble in water, e.g., MgO, approximately 0.05 g of the solid material was added without the water. The components of the prepared samples are shown in Table 1.

The thixotropic-enhancing metal compound was added to the lubricating agent and then the fumed silica was added to the lubricating agent in fourths and mixed in a Kitchen Aid commercial mixer on the stirring speed. The mixer was then stopped so that the sides could be scraped down towards the center of the bowl. The composition was then mixed for a total time of 30 minutes.

It should be noted that even though the lubricating agent was purchased under the same product properties, there may be differences in physical properties of the lubricating agents from batch to batch. Therefore, the lubricating agents disclosed in Table 1 are identified as batch (1) and batch (2). It should also be noted that the amount of thixotropic-enhancing metal compound disclosed in Table 1 is half the solution added to the lubricant composition sample since the solution of metal compound was 50% water for those compounds added as a solution.

Once the lubricant composition had been mixed, the lubricant composition was allowed to rest in a desiccator for about 12 hours to deaerate. Once the air bubbles had escaped, the lubricant composition was ready for testing to determine TS1 and TS2, as described in Example 3 below. The results of the testing to determine TS1 and TS2 are shown in Table 1.

TABLE 1

Components of Lubricant Composition Samples Thickened with Fumed Silica

|  | Lubricating Agent | Silica, wt. % | Metal Comp. | Metal Comp. ppm | TS1 Pa | TS2 Pa | Thixotropic Recovery, % |
|---|---|---|---|---|---|---|---|
| Sample 1 | EMKAROX VG 379W (1) | 6 | None | 0 | 239 | 189 | 79 |
| Sample 2 | EMKAROX VG 379W (1) | 6 | KCl | 500 | 312 | 306 | 98 |
| Sample 3 | EMKAROX VG 379W (1) | 6 | $MgCl_2$ | 500 | 536 | 474 | 88 |
| Sample 4 | EMKAROX VG 379W (1) | 6 | MgO | 500 | 286 | 263 | 92 |
| Sample 5 | EMKAROX VG 379W (1) | 6 | NaOH | 500 | 482 | 461 | 96 |
| Sample 6 | EMKAROX VG 379W (2) | 6 | None | 0 | 108 | 48 | 43 |
| Sample 7 | EMKAROX VG 379W (2) | 6 | KCl | 500 | 283 | 258 | 91 |
| Sample 8 | EMKAROX VG 379W (2) | 6 | $MgCl_2$ | 500 | 525 | 510 | 97 |

As shown in Table 2, adding just a small amount of the thixotropic-enhancing metal compound increased the thixotropic property of the lubricant composition from a recovery of 79% to a recovery of from 88-98% of the starting TS1. The results of the second batch of lubricating agent demonstrated an even larger increase of the thixotropic properties with an increased recovery from 43% without the thixotropic-enhancing compound to 91-97% recovery.

EXAMPLE 2

This example provides a procedure for mixing the components of the lubricant composition having the organoclay as the thickening agent. In general, a higher shear and longer mixing times are required, as compared to some known lubricant compositions, to ensure good dispersion of the organoclay throughout the composition.

Approximately 24 or 26 g of an organoclay (GARAMITE 1958), approximately 174 or 176 g of a lubricating agent (SYNALOX 40D300) and approximately 0.1-0.5 g of a 50-50 wt. % solution of the metal compound in water were measured out separately and combined by hand mixing to make a lubricant composition having 12 or 13 wt. % organoclay. The components of the prepared samples are shown in Table 2. It should be noted that while some of the samples showed an increase in the thixotropic properties, the thixotropic properties were already very high and most of the samples showed only a slight or a negative change in thixotropic properties. However, surprisingly, the addition of the metal compound did increase the TS1.

The metal compound was added to the lubricating agent and then the organoclay was added to the lubricating agent in fourths and mixed until no powder was visible. The mixture was then mixed at 1000 RPM in an overhead mixer (LIGHTNIN Model L1U08F) for 15 minutes. The mixer was then stopped so that the sides could be scraped down towards the center of the bowl. The composition was then mixed for 5 minute periods at 1000 RPM with the bowl scraped towards the middle after each period until the total mixing time had reached about 30 minutes.

TABLE 2

Components of Lubricant Composition Samples Thickened with Organoclay

| | Lubricating Agent | Organoclay, batch #, wt. % | Metal Comp. | Metal Comp. ppm | TS1 Pa |
|---|---|---|---|---|---|
| Sample 1 | SYNALOX 40D300 | Clay 1, 12 | None | 0 | 94 |
| Sample 2 | SYNALOX 40D300 | Clay 1, 12 | NaOH | 1500 | 179 |
| Sample 3 | SYNALOX 40D300 | Clay 2, 12 | None | 0 | 170 |
| Sample 4 | SYNALOX 40D300 | Clay 2, 12 | MgCl$_2$ | 500 | 184 |
| Sample 5 | SYNALOX 40D300 | Clay 2, 12 | CaCl$_2$ | 500 | 200 |
| Sample 6 | SYNALOX 40D300 | Clay 2, 12 | NaOH | 1500 | 321 |
| Sample 7 | SYNALOX 40D300 | Clay 2, 13 | NaOH | 2500 | 722 |

It should also be noted that the amount of metal compound disclosed in Table 2 is half the solution added to the lubricant composition sample since the solution of meal compound was 50% water.

Once the lubricant composition had been mixed, the lubricant composition was allowed to rest for about 24 hours to allow the lubricant composition to restructure. The lubricant composition was then ready for testing to determine TS1 as described in Example 3 below.

As shown in Table 2, adding a small amount of the metal compound does surprisingly increase TS1.

EXAMPLE 3

This example provides the procedure for measuring the threshold stress value of a lubricant composition including both the initial threshold stress value (TS1) and the recovered threshold stress value (TS2) that is measured after the composition has been subjected to an amount of shear stress, as set in the procedure that follows, and then allowed to recover.

The rheological properties were measured on the THERMO HAAKE RheoStress1 cone-plate rheometer with a 35 mm diameter titanium cone having 4 degrees of angle and a truncation of 0.143 mm. The tests were typically run at 20° C.

A sample of the lubricant composition measuring approximately 1.5 g was placed on the center of the plate of the rheometer. The cone part descended rapidly until the gap between the plate and the cone was less than about 6 mm. The cone part slowed its descent at that point to about 0.2 mm/min to avoid shearing the sample too much and to avoid introducing air bubbles in the sample. After the working gap (0.143 mm) was reached, any excess sample was carefully removed with a spatula from the border of the cone to ensure that no lubricant composition remained on the sides of the cone.

Figure 1B:
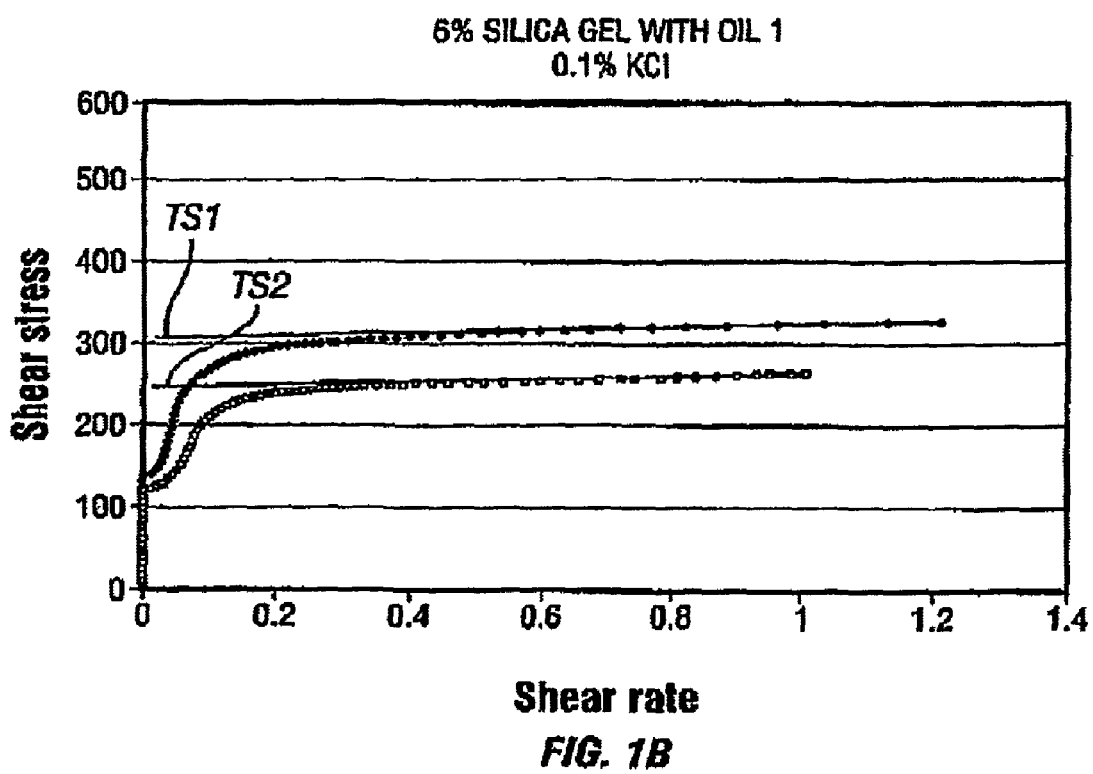
Figure 1C:
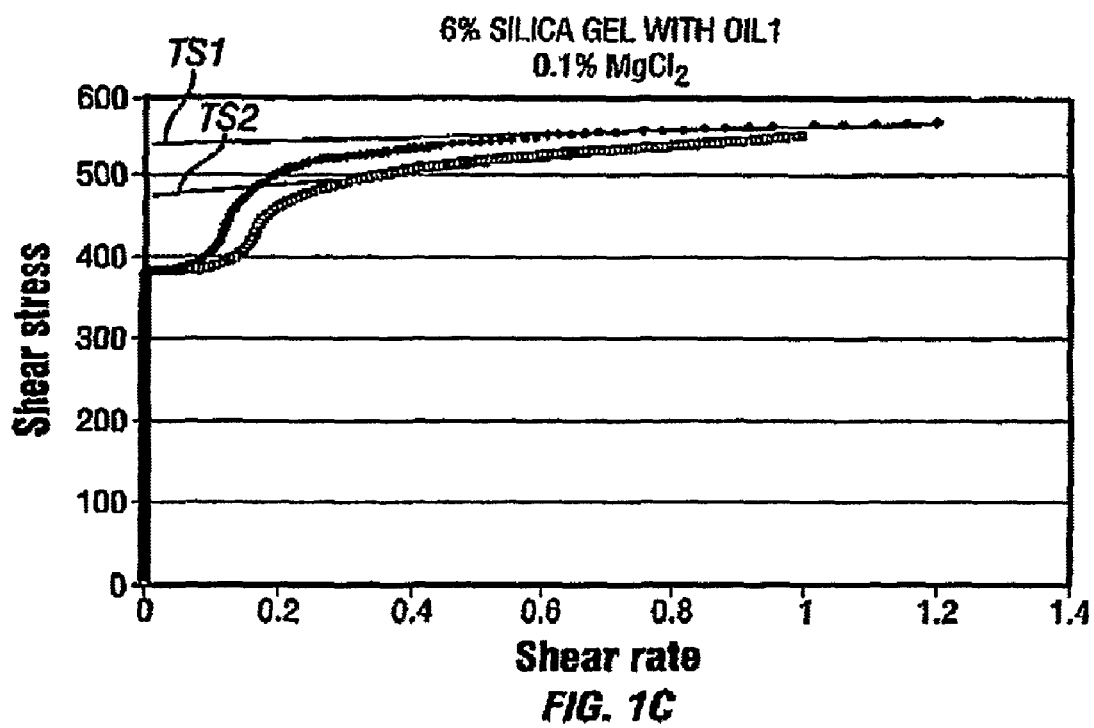
Figure 1D:
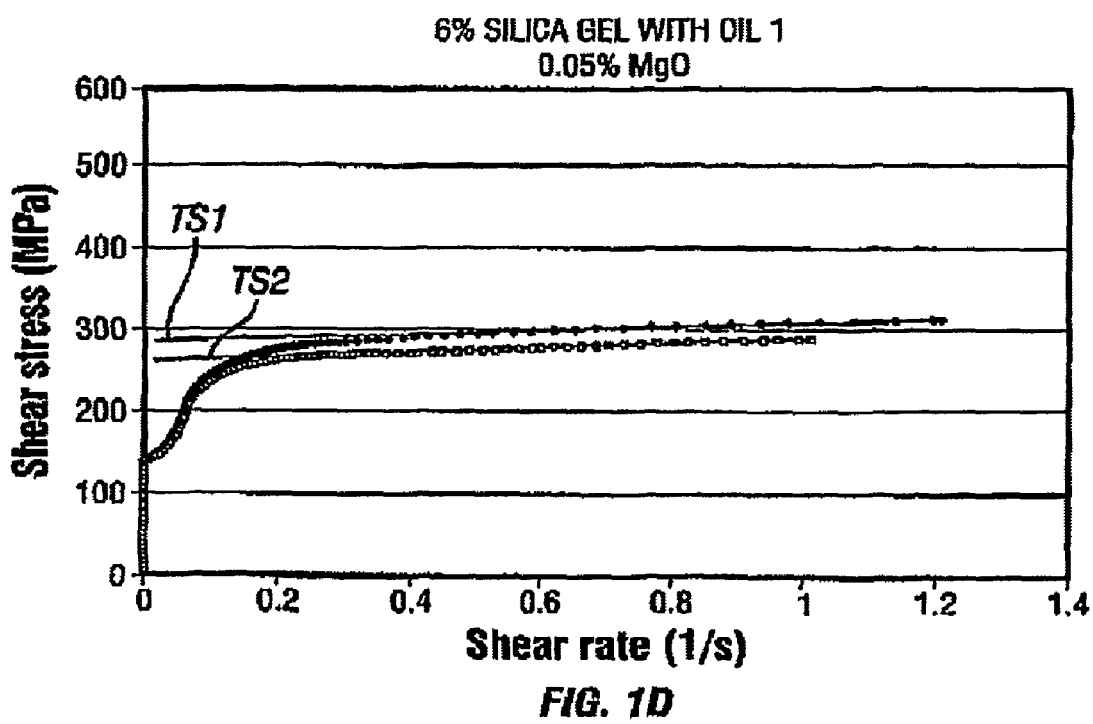
Figure 1E:
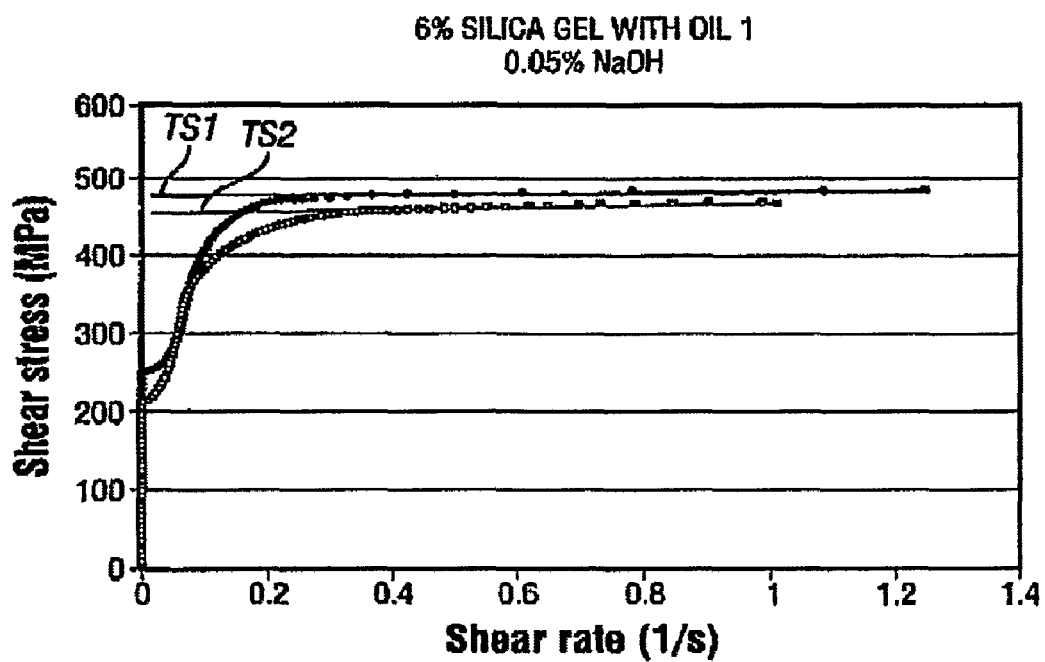
Figure 2A:
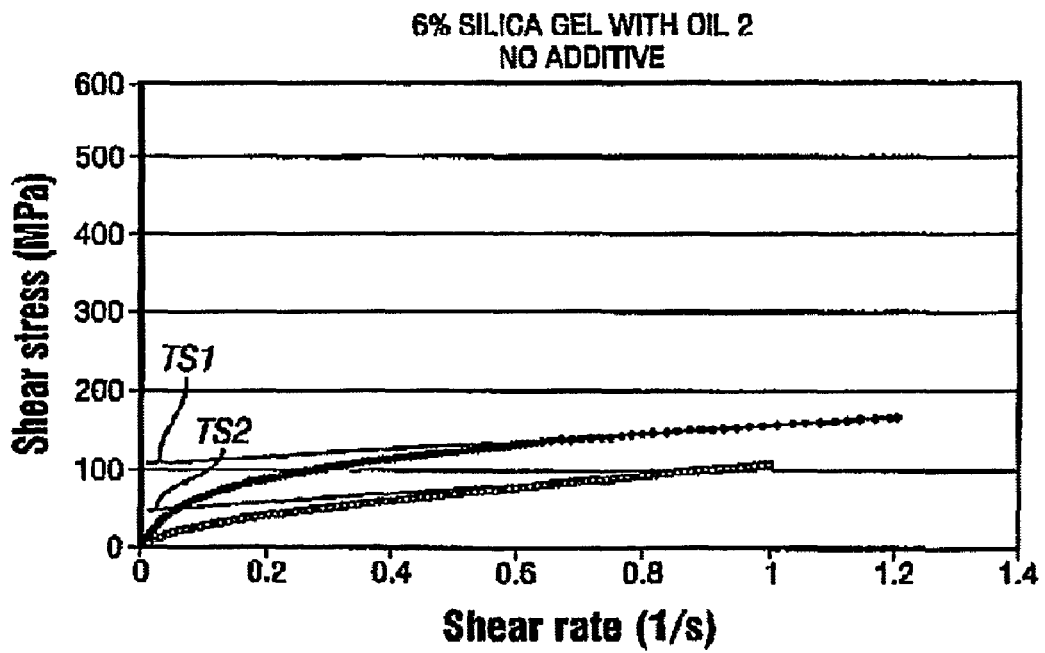
FIGS. 2A-C are graphs of the shear rate plotted against the shear stress obtained similarly to FIGS. 1A-E demonstrating the difference between lubricating agents used in lubricant compositions.
Figure 2B:
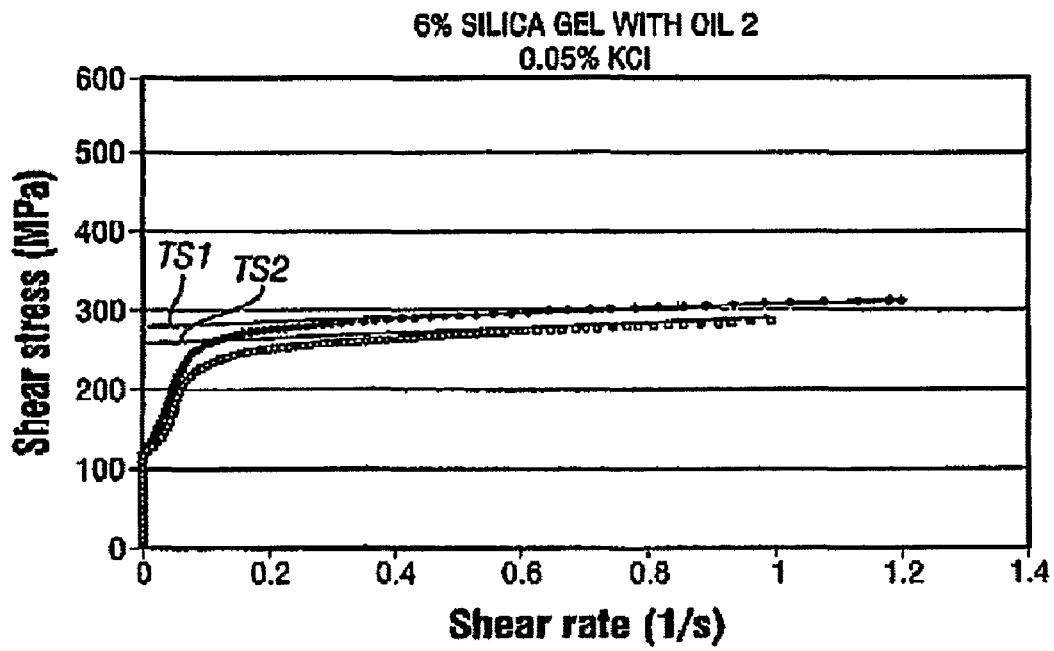
Figure 2C:
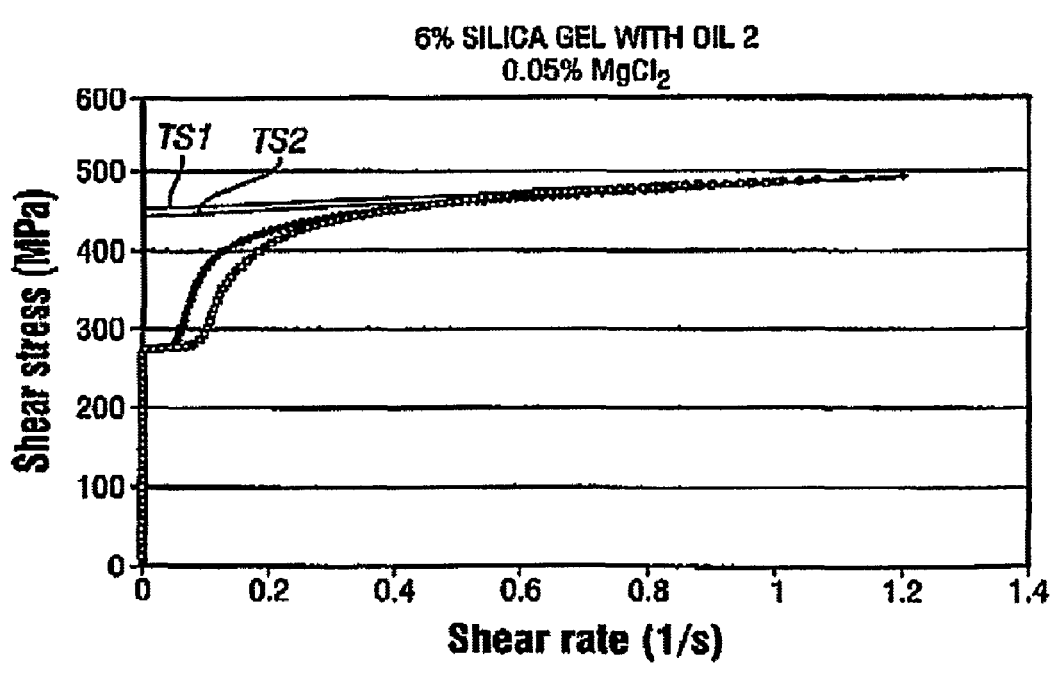

The sample was subjected to a controlled shear rate of 0.5 s$^{-1}$ for a period of 200 seconds. The sample was then allowed to rest for 600 seconds. The rheometer then applied an initial shear stress of 1.0 Pa and linearly increased the shear stress to 1000 Pa over a 1000 second period. The shear stress was recorded as a function of the shear rate over this period of time. FIGS. 1A-E are graphs of the shear rate plotted against the shear stress obtained from the rheometer during the procedure. The initial threshold stress values TS1 of the lubricant compositions as shown in FIGS. 1A-E, as well as the other figures, were determined by obtaining the X=0 intercept by linear regression analysis of the stress versus shear rate between the shear rate values of 0.7 and 1.5 s$^{-1}$. The initial threshold stress values for the lubricant composition samples are shown in Tables 1 and 2.

The sample was then allowed to rest for 600 seconds without any shear applied and then the sample was subjected to a controlled shear rate of 0.3 s$^{-1}$ for 300 seconds during which time the viscosity of the sample was measured. Viscosities were then typically measured at 0.3, 1, 3 and 10 s$^{-1}$ and then again at 3 s$^{-1}$ as a final measurement. Taking these viscosity readings subjected the lubricant composition to stress so that a recovered threshold stress value TS2 of the worked lubricant compositions could be measured after the viscosity readings were obtained.

To determine the recovered threshold values TS2 of the lubricant compositions after being subjected to the shear forces during the acquisition of the viscosity measurements, the lubricant compositions were subjected to a linear controlled stress increase from 1 Pa to 600 Pa over a 700 second period. The same method using linear regression analysis was then used to determine TS2 as was used to determine TS1. The results are shown as TS2 on the attached figures and in Tables 1 and 2.

The terms "comprising," "including," and "having," as used in the claims and specification herein, shall be considered as indicating an open group that may include other elements not specified. The term "consisting essentially of," as used in the claims and specification herein, shall be considered as indicating a partially open group that may include other elements not specified, so long as those other elements do not materially alter the basic and novel characteristics of the claimed invention. The terms "a," "an," and the singular forms of words shall be taken to include the plural form of the same words, such that the terms mean that one or more of something is provided. The terms "at least one" and "one or more" are used interchangeably. The term "one" or "single" shall be used to indicate that one and only one of something is intended. Similarly, other specific integer values, such as "two," are used when a specific number of things is intended. The terms "preferably," "preferred," "prefer," "optionally," "may," and similar terms are used to indicate that an item, condition or step being referred to is an optional (not required) feature of the invention.

It should be understood from the foregoing description that various modifications and changes may be made in the preferred embodiments of the present invention without departing from its true spirit. The foregoing description is provided for the purpose of illustration only and should not be construed in a limiting sense. Only the language of the following claims should limit the scope of this invention.

What is claimed is:

1. A lubricant composition, comprising:
   a polyoxyalkene as a lubricating agent;
   between 4 wt. % and 7.5 wt. % of silica as a thickening agent;
   no more than 1% water; and between 300 ppm and 2 wt. % of an inorganic thixotropic-enhancing metal oxide, wherein a metal component of the thixotropic-enhancing metal oxide is selected from alkali metals, alkaline earth metals, iron, cobalt, nickel, copper, aluminum or combinations thereof, wherein the lubricant composition viscosity is between 10 Pa-s and 60 Pa-s measured at 20° C. with a shear rate of 10 $s^{-1}$, and wherein the inorganic thixotropic-enhancing metal oxide provides an increase in a recovered threshold stress value TS2 of the lubricant composition to at least about 90% of the initial threshold stress value TS1.

2. The composition of claim 1, wherein the inorganic thixotropic-enhancing metal oxide is added in an amount of between 300 ppm and 700 ppm, by weight.

3. The composition of claim 1, wherein the thixotropic-enhancing metal oxide is selected from CaO, MgO or combinations thereof.

4. The composition of claim 1, wherein the composition comprises less than 300 ppm by weight of water.

5. The composition of claim 1, wherein the composition comprises less than 700 ppm by weight of water.

6. The composition of claim 1, wherein the composition comprises no water.

* * * * *